United States Patent [19]

Jamieson et al.

[11] Patent Number: 5,687,068

[45] Date of Patent: Nov. 11, 1997

[54] POWER SUPPLY FOR IN-LINE POWER CONTROLLERS AND TWO-TERMINAL ELECTRONIC THERMOSTAT EMPLOYING SAME

[75] Inventors: Robert Stuart Jamieson, Boynton Beach, Fla.; John Weiss, Mt. Sinai, N.Y.

[73] Assignee: Micro Weiss Electronics, Inc., West Babylon, N.Y.

[21] Appl. No.: 577,635

[22] Filed: Dec. 22, 1995

[51] Int. Cl.⁶ .................................................. H02M 7/06
[52] U.S. Cl. ................................. 363/126; 307/83
[58] Field of Search ........................ 363/16, 37, 89, 363/97, 125, 126; 307/71, 77, 83, 55

[56] References Cited

U.S. PATENT DOCUMENTS

| | | | |
|---|---|---|---|
| 4,009,431 | 2/1977 | Johnson | 307/71 |
| 4,039,927 | 8/1977 | Richards, Jr. et al. | 323/17 |
| 4,320,305 | 3/1982 | Thomas | 307/6 |
| 4,464,606 | 8/1984 | Kane | 315/158 |
| 5,196,781 | 3/1993 | Jamieson et al. | 320/61 |
| 5,398,182 | 3/1995 | Crosby | 363/89 |

*Primary Examiner*—Matthew V. Nguyen
*Attorney, Agent, or Firm*—Hoffmann & Baron, LLP

[57] ABSTRACT

A two-terminal electronic thermostat connectable in series with an electrical heater and a source of AC power and selectively providing AC power to the electrical heater, and a power supply incorporated in the thermostat for providing DC power to the control circuitry of the thermostat, includes a relay connectable in series with the electrical heater, a control circuit for selectively actuating the relay, an ambient temperature sensor and a potentiometer for setting a set point temperature. The power supply includes a current transformer having its primary winding connected in series with the relay and the electrical heater. The power supply also includes a first bridge rectifier circuit, a second bridge rectifier circuit connected to the secondary winding of the current transformer and a capacitor divider network formed from first and second capacitors and providing a desired DC voltage to the control circuit. The first capacitor is coupled to the first bridge rectifier circuit. The first and second bridge rectifier circuits have DC outputs which are connected across the second capacitor of the network, which also acts to filter the DC voltage provided to the control circuit of the thermostat.

24 Claims, 4 Drawing Sheets

POWER SUPPLY FOR IN-LINE POWER CONTROLLERS AND TWO-TERMINAL ELECTRONIC THERMOSTAT EMPLOYING SAME

BACKGROUND OF THE INVENTION

1. Field of the Invention

This invention relates to power supplies for two-terminal electronic power controllers connected in series with their loads, and more particularly relates to battery-less electronic wall-mounted two-terminal thermostats for controlling the temperature in a room.

2. Brief Description of the Prior Art

Wall mounted electronic thermostats are well established for controlling room temperatures. These devices are commonly powered by batteries or by low voltage alternating current sources, typically 24 volts AC (alternating current). In addition to the common problems associated with forgetting to change batteries, low voltages caused by aging batteries can affect calibration and eventually cause false or ambiguous operation of the thermostat. A more complete discussion of the latter effect is present in U.S. Pat. No. 5,196,781, issued to the present co-inventors, the disclosure of which is incorporated herein by reference.

In many applications there is no low voltage power source available, especially when the thermostat is to control electric heaters powered by AC mains. Many such applications involve the replacement of mechanical thermostats, which inherently require no power source and thus have only two terminals. In these applications—aside from employment of batteries—the only available power source is the high voltage alternating current present on the AC mains. In such applications the controller operates in series with the heater, and is a two-terminal device. While power may be taken from the open-circuit voltage existing across the switch contacts, in the no-load condition, that potential source of power will disappear when the switch operates to connect the heater to the mains. A special transformer with two primary windings has been employed for this use, one of which obtains power from load current during the period when the switch contacts are closed. As will be discussed in detail herein, this approach suffers from an inherent power loss commensurate to the total power required by the thermostat's internal circuitry. At a period in which every effort is being made to design household appliances with the maximum power efficiency, this inefficiency is a serious drawback.

OBJECTS AND SUMMARY OF THE INVENTION

It is an object of the present invention to provide an electronic thermostat capable of direct replacement of two-terminal mechanical thermostats.

It is another object of the present invention to provide a two-terminal power controller that is series-interconnectable with another electrical device to control power to the device.

It is a further object of the present invention to provide an electronic circuit for providing power to an electronic thermostat having only two terminals, without using batteries, during both the open contact (open circuit) and the closed contact (closed circuit) states.

It is a further object of the present invention to provide a circuit for providing power to a two-terminal electronic thermostat, during both the open contact and the closed contact states, at high efficiency.

It is yet another object of the present invention to provide a circuit for providing power for an electronic thermostat having only two terminals, during both the open contact and the closed contact states, at minimum cost.

It is yet another object of the present invention to provide a circuit for providing power for an electronic thermostat having only two terminals, during both the open contact and the closed contact states, over a wide range of power mains voltages.

It is yet another object of the present invention to provide a circuit for providing power for an electronic thermostat having only two terminals, during both the open contact and the closed contact states, to be self-setting for operation at two values of power mains voltages.

In accordance with one form of the present invention, a two-terminal series power controller comprises an electronically controlled series switching element responsive to the parameter to be controlled, a first transformer whose primary winding is connected in parallel with the electronically controlled switch contacts, and whose secondary winding provides a first low-voltage alternating current to a first rectifier while the switch is open, and a second transformer having a primary winding connected in series with the switch, whose secondary winding provides a second low voltage alternating current to a second rectifier while the switch is closed, the outputs of both rectifiers being connected in parallel, thus each being capable of furnishing direct current operating power in alternation.

In accordance with another form of the invention, a two-terminal series power controller comprises an electronically controlled series switching element responsive to the parameter to be controlled, a capacitive voltage divider connected in parallel with the electronically controlled switch contacts, the output of the capacitive voltage divider providing a first low-voltage alternating current to a first rectifier while the switch is open, and a current transformer having a primary winding connected in series with the switch, whose secondary winding provides a second low voltage alternating current to a second rectifier while the switch is closed, the outputs of both rectifiers being connected in parallel, thus each being capable of furnishing direct current operating power in alternation.

The two-terminal series power controller of the present invention further includes a direct current regulator designed to operate over a wide range of input voltages, such that the installer need make no change or adjustments to use the controller on either 120 or 240 volt AC power mains.

The two-terminal series power controller of the present invention further includes a self-setting circuit designed to reconfigure the power supply so as to permit operation over a wide range of input voltages, such that the installer need make no change or adjustments to use the controller on either 120 or 240 volt AC power mains.

In accordance with the present invention the two-terminal series power controller designed as a thermostat further includes temperature sensing means for causing the switch contacts to open and close, as needed for heating or cooling the ambient temperature.

DETAILED DESCRIPTION OF THE PRIOR ART

Figure 1:
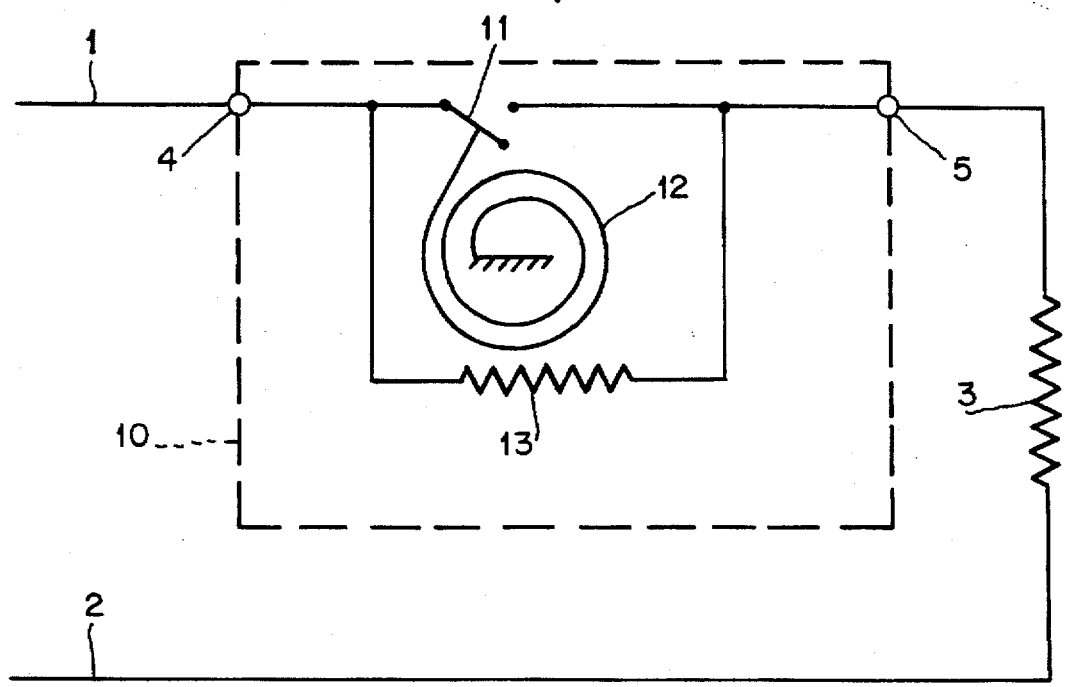
FIG. 1 is a simplified diagram of a prior art two-terminal bimetal mechanical thermostat connected to power mains and a load.

FIG. 1 illustrates the general principles of operation of a two-terminal mechanical thermostat 10, of the prior art, having two electrical terminals, 4 and 5. Terminals 4 and 5 may be short wire pigtails, screw terminals, or any of the many connection means known in the art. Conductors 1 and 2 are the AC power mains, operating at 120 volts, or alternatively, at 240 volts. Resistor 3 represents the load to be controlled by thermostat 10; this is usually a heater of 500 to over 5000 watts rating. According to principles well known in the art, bimetallic spring 12 tends to coil and uncoil as the ambient temperature changes, which action tilts a glass capsule mercury switch—here represented by symbolic switch 11. When the temperature rises past the desired temperature set point, the tilting causes the mercury to move away from two electrical contacts, thus opening the circuit and interrupting current flow to heating element 3. Adjustment of the set point is usually accomplished by tilting the mounting of the spring a small amount—not shown in FIG. 1. As the ambient temperature falls, the capsule tilts back and the mercury bridges the contacts, applying voltage to heating element 3. The high mass inherent in the glass capsule and the bimetallic spring causes appreciable delay in responding to ambient temperature changes. In order to generate sufficient force to overcome this mass the temperature must go well past the set point; thus these thermostats exhibit a significant hysteresis.

An attempt to reduce hysteresis employs a small heater, called an "anticipator" in the art. The anticipator is usually a small resistor connected across the switch terminals, depicted symbolically by resistor 13 in FIG. 1. When the temperature is below the set point the contacts are open, and full mains voltage is impressed on resistor 13. Being in close proximity to bimetal spring 12 its heat tends to cause early closure of mercury switch 11. With proper design this closely counteracts the late opening tendency of bimetallic spring 12. Once contacts 11 are closed there is little or no voltage across resistor 13, and it cools down. Thus it has no effect on late opening action when high ambient temperature acts to open the contacts of switch 11. In any case, since anticipatory cooling would be required during this phase of operation, anticipatory heating could provide no benefit. Any residual heat left in resistor 13 and bimetallic spring 12 would cause further delay in opening switch 11.

High power heaters are generally designed for 240 volt operation, to reduce conductor resistive losses and/or use smaller diameter wire. The prior art thermostat of FIG. 1 could operate over a wide range of voltages, with proper design of the contact spacing in the glass capsule; however, the presence of an anticipator resistor limits the thermostat to a particular voltage. An anticipator resistor designed for 240 volt operation would provide only one-fourth its heating power at 120 volts.

A major disadvantage of the glass capsule switch is the presence of mercury, with attendant problems with safe manufacture, accidental breakage, and disposal. To avoid these problems some mechanical thermostats use snap-action toggle mechanisms carrying contacts, actuated by the bimetallic spring. The force required to cause these mechanisms to act increases the hysteresis, and resulting temperature differential. Often micro switches are employed instead, but these also increase hysteresis, due to the actuation forces required.

A major advantage of mechanical thermostats is their reliability. They require no batteries or other sources of electrical power. However, their hysteresis causes large temperature swings, which result in extra energy consumption of about three percent of heater power per degree Fahrenheit. This is a substantial energy waste, being over one kilowatt-hour per day for a one degree temperature overshoot using a 1600 watt heater.

Electronic thermostats employ sensing systems in which mass and inertia do not play a roll. Thus an electronic thermostat can provide fast response to rapid temperature changes, and provide a higher degree of comfort. Reduction of large temperature swings due to sensor hysteresis directly reduces power consumption and improves comfort. Further energy savings may be obtained by employing lower temperature settings for operation at night. This latter capability requires electronic clocks for operation; in the case of two-wire thermostats, these usually rely on batteries for power, with resulting problems discussed earlier. An additional difficulty with battery power is the high power drain required by relays; a relay with a high current rating requires about one half watt of power. Small dry-cell batteries cannot operate under this load for more than a few days.

Figure 2:
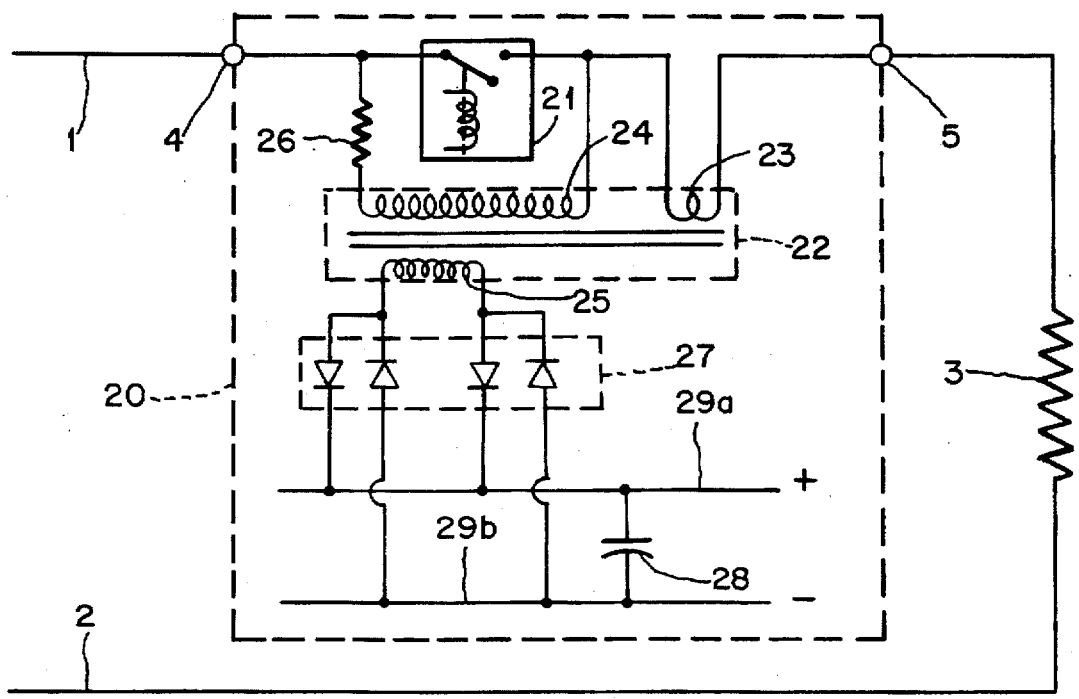
FIG. 2 is a schematic diagram of the power supply of a prior art electronic two-terminal thermostat.

FIG. 2 illustrates how one prior art two-terminal electronic thermostat obtains power without extra connections or batteries. In FIG. 2, lines 1 and 2 represent the identical mains wiring of FIG. 1. Heating element 3, and terminals 4 and 5 are identical to those of FIG. 1. Thus thermostat 20 of FIG. 2 is intended to be a direct replacement for the mechanical thermostat of FIG. 1.

Switch 21 is shown symbolically as a relay. Switch 21 is capable of carrying full load current, controlled electronically in response to temperature sensing means (not shown) and obtains power from an internal direct current power supply. The power supply also operates all sensing and control electronics, these latter being omitted for clarity, and being beyond the scope of this discussion. As with switch 11, switch 21 opens when ambient temperature is above the desired set point temperature, and closes when the ambient temperature is lower than the desired set point. Relay 21 may be other electronically operated switching devices, such as silicon-controlled-rectifiers, triacs, and the like.

Transformer 22 has three windings. Winding 25 is the output winding which furnishes alternating current to rectifier means 27, a diode bridge rectifier. Rectifier means 27 could be a single diode for half-wave rectification, although this would require a larger transformer to avoid saturation from the resultant average direct current, as is well known. Alternatively, if winding 25 were center-tapped, full wave rectification could be obtained with only two diodes, as is also well known in the art. However, this would require winding 25 to have twice the number of turns, increasing cost and volume. Diodes being smaller and less expensive, the bridge rectifier configuration appears to be the best choice.

Winding 24 is connected across the contacts of relay 21 through limiting resistor 26. Thus, winding 24 is excited by a proportion of the voltage existing across the contacts of relay 21. When those contacts are open, essentially full mains voltage appears across the contacts; the voltage impressed on winding 24 is directly proportional to the ratio of its impedance to the total series impedance of winding 25 and resistor 26. The turns ratio of primary winding 24 to secondary winding 25 is the same as the ratio of their voltages, ignoring copper and core losses. When relay 21 closes, the voltage across the contacts of relay 21 drops to a few millivolts; thus, winding 24 can no longer furnish power.

Winding 23 is a second primary winding excited by the high current flowing through heating element 3 when relay 21 closes its contacts. Thus, it can furnish power to secondary winding 25 when the other primary winding 24 is unable. To avoid a significant voltage drop across primary winding 23, it must be limited to a few turns; it is acting as the primary winding of a current transformer, a type well known in the art. Transformer 22 is thus a combination voltage and current transformer in which each primary acts as a secondary to the other.

Capacitor 28 is applied across the output of rectifier 27, in the usual manner for filtering out ripple. Capacitor 28 is an electrolytic type, connected across the unregulated direct current supply leads, designated 29a and 29b in FIG. 2. If it is made large enough, it can carry enough energy to supply the sensing and control circuitry and relay 21 while relay 21 is switching, and during consequent delays in rise times of the primary windings due to their inductances.

Limiting resistor 26 is essential to this power supply system; it makes operation possible but also causes an unavoidable and significant power loss. If resistor 26 were zero ohms, the closed contacts of relay 21 would impose a short circuit on winding 24, causing an extremely high current sufficient to burn it out. Thus resistor 26 must be present, to provide a reasonable load on winding 24 when relay 21's contacts are closed. This extra load, over and above the normal load on secondary winding 25, requires an increase in transformer core cross-section to accommodate higher flux levels and prevent saturation.

The smaller the value of resistor 26, the greater the proportion of mains voltage available for exciting winding 24, when it is acting as a primary. The greater its exciting voltage, the smaller the current flowing in winding 24 and, consequently, the smaller its copper losses and/or wire diameter, and, as stated above, the closer its load approaches a short circuit, when acting as a secondary. These two opposed tendencies must be balanced out in design. Minimum copper size will be attained for winding 24 when its primary phase currents match its secondary phase currents. This implies that resistor 26 must be sized to present only half the full mains voltage to winding 24.

By way of proof, a numerical example will suffice: Consider an example of an electronic wall thermostat with a sensing and control circuit power requirement of 1 watt, and ignore core, copper and diode losses. If resistor 26 is set so as to limit winding 24 to half the mains voltage, then the current through winding 24 must pass 1 watt to the rectifier; the same current must also pass through resistor 26, and at the same voltage. That is, both transformer 22 and resistor 26 must each require 1 watt, for 2 watts total, a doubling of power. Without all other losses being taken into account, it is obvious this power supply can never surpass 50 percent efficiency.

If mains voltage is 240 volts, the primary phase current will be 8.33 milliamperes. When winding 24 acts as a secondary, its voltage will be the same 120 volts—for winding 23 must supply full output voltage to winding 25, and the turns ratios thus ensure full voltage also on winding 24. Its current will also be 8.33 milliamperes. Thus, both primary action phase currents and secondary action phase currents are equal, and wire size is at the minimum value commensurate with these currents. Any departure in value of resistor 26 will increase one current or the other, requiring a larger wire size and larger transformer.

Another disadvantage with the conventional thermostat power supply shown in FIG. 2 is that transformer 22 must be designed to a specific mains voltage. While a transformer designed for 120 volts (for operation on 240 volt mains) can operate at 60 volts, it cannot furnish full power at 60 volts. For this reason transformers designed for a plurality of operating voltages have a plurality of taps for connecting those voltages to the proper number of turns. In a wall-mounted thermostat designed for two mains voltages, a tap-changing switch could be used. However, this presents a strong possibility of problems in proper setting of the switch by unsophisticated householders. Setting the switch for 240 volts and applying 120 volts would cause the power supply to starve the sensing and control circuitry, causing faulty operation. This error is to be preferred over the reverse, for then the thermostat would fail and perhaps cause a fire.

No mention has been made so far about loads on current winding 23 during relay 21's open circuit periods, for although this winding has become a secondary at that time, the open circuit conditions prevent current flow.

However, when relay 21 is closed, current winding 23 not only must furnish the power furnished to secondary winding 25 and consumed by relay 21 and the sensing and control circuitry of the thermostat, but also must furnish all the power consumed by resistor 26. Thus, the transformer magnetic core cross section area must be large enough to handle this doubled load without saturating. In the example cited above, this core must be sized for 2 watts. There would be no appreciable need to increase winding 23's wire size for this load, since it must be sized to handle the very high current through heater 3.

DETAILED DESCRIPTION OF THE INVENTION

Figure 3:
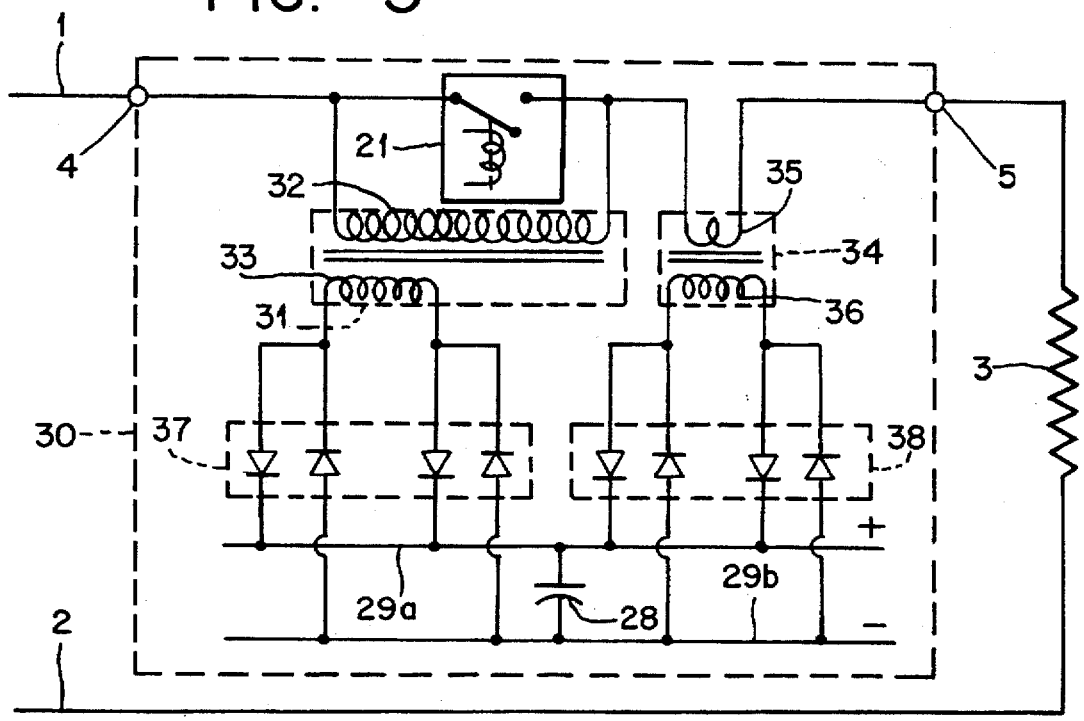
FIG. 3 is a schematic diagram of the unregulated portion of the power supply of the present invention, employing two transformers and two rectifiers.

Referring to FIG. 3, it will be seen that the power supply of the present invention eliminates the inherent inefficiency discussed above. FIG. 3 illustrates an electronic power controller of one form of the present invention, indicated generally by numeral 30. Elements 1 through 5 are the same and perform identical functions as the components of like reference number described in connection with FIGS. 1 and 2. Further, relay 21 and capacitor 28 are as described heretofore and function in the same way.

Transformer 31 comprises primary winding 32, and secondary winding 33; winding 33 is connected to the input of rectifier 37. The output of rectifier 37 is connected to capacitor 28 via positive and negative DC (direct current) leads, 29a and 29b respectively.

Current transformer 34. Secondary separate from transformer 31, comprises primary winding 35 and secondary winding 36; winding 36 is connected to the input of a second rectifier 38 operating independently of rectifier 37. The output of rectifier 38 is connected to capacitor 28 via positive DC lead 29a, and negative DC lead 29b.

During the OFF state, or open-circuit state, while relay 21's contacts are open, no current flows through heater element 3, and power flows through transformer 31 and rectifier 37 to filter capacitor 28. Transformer 34 is inactive, for primary winding 35 has no excitation current. Rectifier 38 cannot conduct in reverse, so there is neither alternating nor direct current flowing in secondary winding 36.

During the ON state, or closed circuit state, while relay 21's contacts are closed, load current flows through relay 21's contacts, current primary winding 35, and heater element 3, and power flows through transformer 34 and rectifier 38 to filter capacitor 28. Transformer 31 is inactive, for there is little or no excitation voltage appearing across primary winding 32. Rectifier 37 cannot conduct in reverse, so there is neither alternating nor direct current flowing in secondary winding 33.

There is no interaction between transformers, their being isolated by rectifiers 37 and 38. Hence, although closing relay 21's contacts places a short circuit load on winding 32, no current flows in winding 32, for winding 33 sees no excitation voltage.

In contradistinction to the prior art of FIG. 2, there is no limiting resistor and its power loss. Applying the earlier numerical example, and again ignoring all other losses, since the 1 watt loss on resistor 26 is eliminated, efficiency can approach 100 percent, depending upon transformer efficiency and diode losses. If a value of 80 percent is assigned to transformer efficiency and diode efficiency combined, in a 1 watt supply this represents losses of 200 milliwatts. Thus, the efficiency of the power supply of FIG. 2 would be 45 percent and that of FIG. 3, 83 percent, during relay 21's open contact state. Moreover, during this open state operation, transformer 31 does not drive relay 21, and so can be designed for much lower power levels, resulting in less power loss, small size and low cost.

The core of current transformer 34 is selected to handle only the power transmitted to rectifier 38, there being no other loads, in contradistinction to the prior art of FIG. 2.

As discussed earlier, capacitor 28 is made large enough to deliver adequate power during switching transients. It must also furnish the energy to close relay 21 when the closed circuit state is initiated. Rectifiers 37 and 38 may be bridge rectifiers, single diode half-wave rectifiers or full-wave two diode rectifiers with center tapped secondary windings, while employing proper design precautions inherent to those configurations. Further, relay 21 may be a set of silicon-controlled-rectifiers, or triacs, and the like switching elements, separately or combined.

While the power supply of FIG. 3 requires two transformers; this is at least partially offset by the use of smaller cores, and in the case of transformer 31, a much smaller core and wire size. The embodiment of the present invention of FIG. 3 requires two rectifiers, but the attendant extra cost is more than offset by the elimination of power resistor 26 and long term energy savings.

Figure 4:
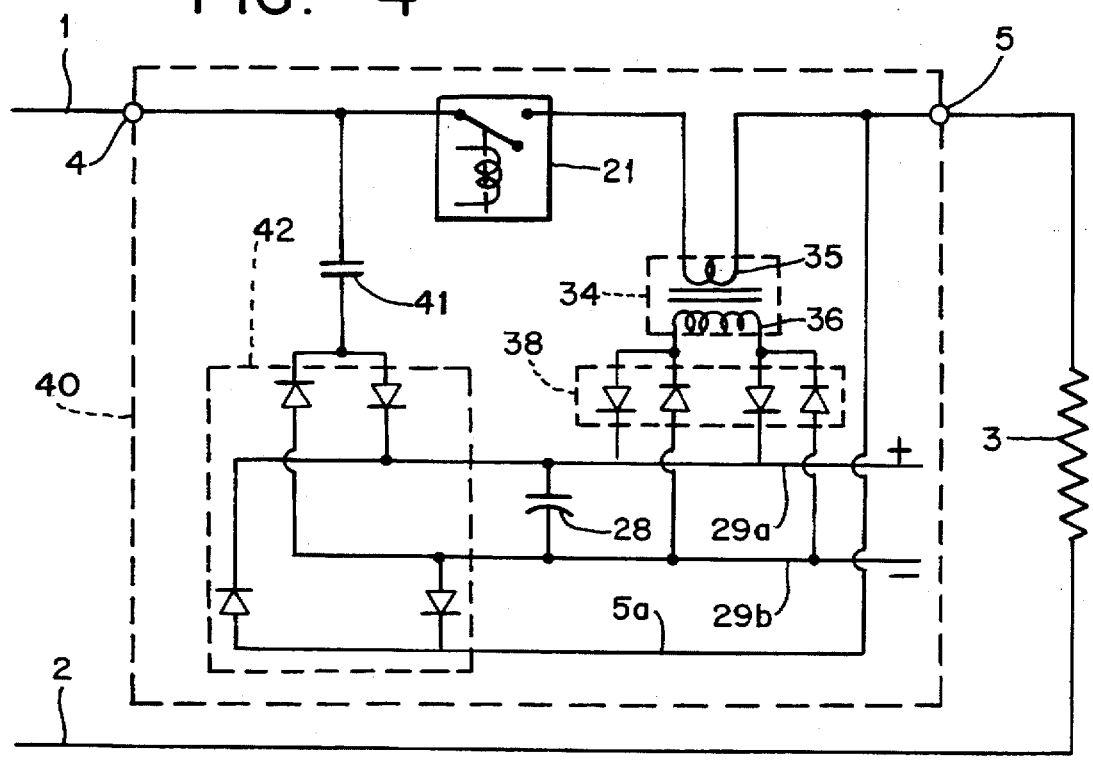
FIG. 4 is a schematic diagram of the unregulated portion of the power supply of the present invention, employing a current transformer, a capacitive voltage divider, and two rectifiers.

Referring to FIG. 4, it will be seen that this alternative form of the present invention further improves efficiency and reduces size and cost. The power supply of electronic power controller 40 employs only one transformer having only two windings. As with FIG. 3, AC mains 1 and 2, heater 3, terminals 4 and 5, and electronic switching means, symbolized by relay 21, are identical to those elements discussed heretofore. Transformer 34 is identical to that of the same reference number illustrated in FIG. 3, and acts in identical manner. As discussed in connection with the power supply of FIG. 3, rectifier 38 isolates transformer 34 from all other circuit elements.

Capacitor 41 is connected from terminal 4 to one input of second bridge rectifier 42. The other input of rectifier 42 is connected to terminal 5 (via lead 5a), thus impressing the open circuit voltage existing across relay 21's contacts upon the series string of rectifier 42 and capacitor 41. The output of rectifier 4 is connected across filter capacitor 28, via DC leads 29a and 29b.

Capacitor 41, taken together with capacitor 28, forms an alternating current voltage divider. The AC voltage— rectified by bridge rectifier 42—impressed on capacitor 28, is a percentage of mains voltage in proportion to the ratio of impedance of capacitor 28 to the total impedance of capacitors 41 and 28 in series (ignoring the slight voltage drop of bridge rectifier 42). This AC voltage division occurs, despite the seeming paradox of filtered DC voltage operation of capacitor 28, for the currents fed to capacitor 28 by bridge rectifier 42 are truly bi-directional currents, symmetrical in shape, as though no rectifier were present.

During the OFF state, or open-circuit state, while relay 21's contacts are open, no current flows through heater element 3, and current flows through capacitor 41 and rectifier 42 to filter capacitor 28. As mentioned in connection with the power supply of FIG. 3, relay 21 is not actuated until the end of the OFF state, so the current required is quite small, as will be illustrated later.

When selecting the value of capacitors 28 and 41, filtering, transient storage, and the equivalent impedance of DC current furnished to sensing and control circuitry, must be borne in mind. Capacitor 28 is chosen first, to provide adequate filtering and energy storage during switching transient time. Its reactance, in parallel with equivalent load current resistance, presents a complex impedance which must be used in calculating total capacitive divider impedance and the resulting reactance of capacitor 41 in order to provide the proper voltage division.

Capacitor 41 is quite small in comparison to transformers 31 and 22. Its cost is less than 20 percent of that of transformer 31. Furthermore, its efficiency is much higher than that of a transformer, its power losses being orders of magnitudes lower at the 60 hertz mains power frequency.

During the OFF, or open circuit, state, operation of transformer 34 and rectifier 38 is identical to that discussed in connection with FIG. 3.

Figure 5:
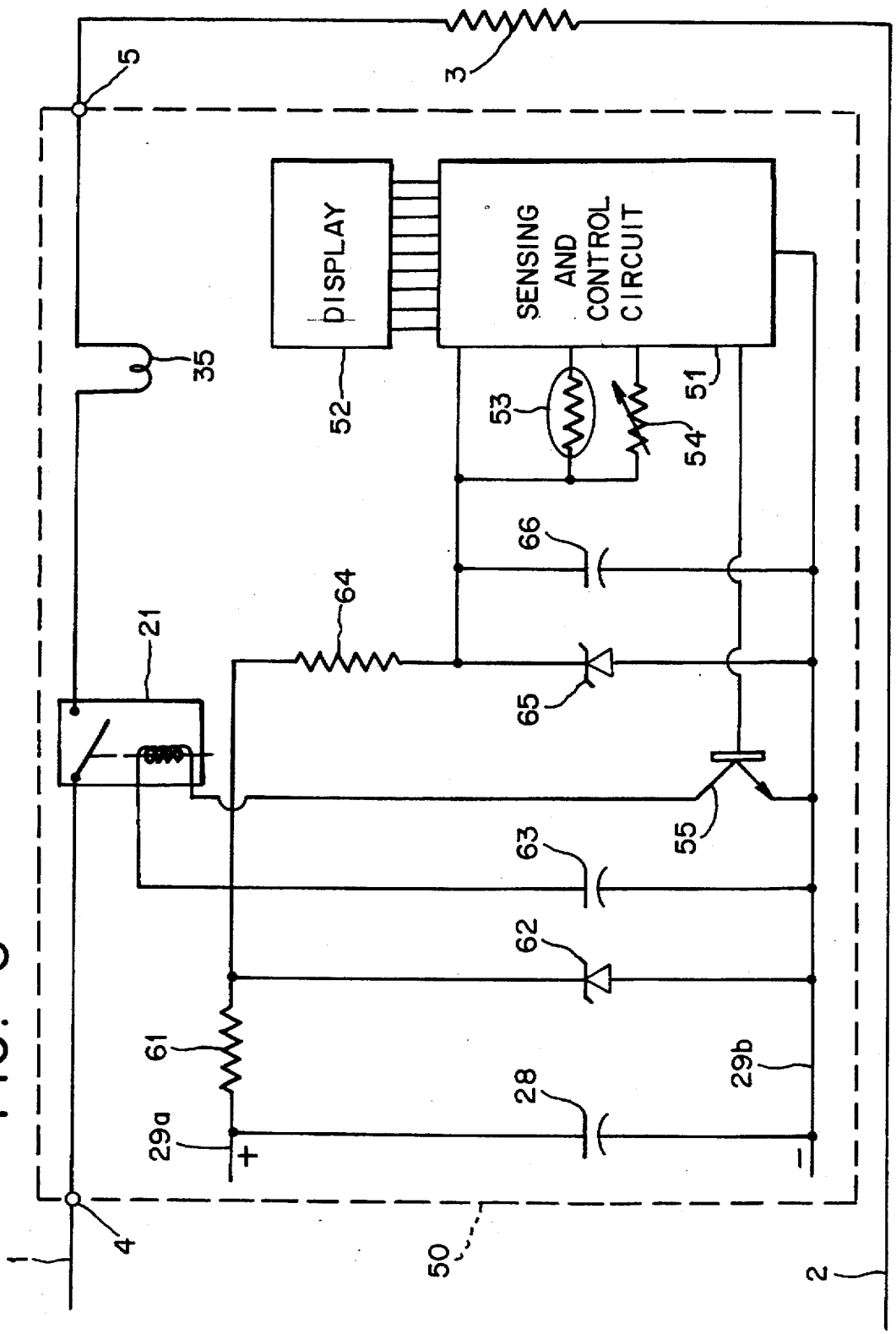
FIG. 5 is a simplified block diagram of a two-terminal electronic thermostat, including a schematic diagram of the regulated power supply stages of the present invention.

FIG. 5 presents a simplified block diagram of a two-terminal electronic thermostat, including a schematic diagram of the regulated portion of the power supplies of the present invention. Electronic thermostat 50 is connected to power mains 1 and 2 and heating element 3, via terminals 4 and 5, as heretofore. It should be emphasized that thermostat 50, being non-polar, can be connected to line 2, instead of line 1, the relative positions of thermostat 50 and heater 3 being immaterial as long as they are connected in series. This simplifies installation, a valuable feature, especially for unsophisticated do-it-yourself home owners.

A brief description of the basic function of electronic thermostat 50 is as follows: A sensing and control circuit, preferably an integrated circuit 51, drives display 52, and performs all sensing and control functions. Variable resistor 54 represents the desired temperature set point controller, and sensor 53 (such as a thermistor) measures the ambient temperature. When the ambient temperature is less than the set point—in a heating application—integrated circuit 51 applies a voltage to the base of NPN bipolar switching transistor 55, and transistor 55 goes into collector-emitter saturation, allowing current to flow through the coil of relay 21 which then actuates, closing its contacts so current flows through heater 3. When the ambient temperature exceeds the set point temperature, integrated circuit 51 cuts off base current to transistor 55, which turns it off; the coil of relay 21 is consequently no longer excited. This causes an open circuit condition across the relay terminals, and heater current is cut off. For application in cooling a room, the opposite logic would apply, that is, high temperatures would cause a closed circuit state of relay 21 and the resulting current flow would actuate cooling fans, air conditioners, and the like.

Full details of all functions, circuitry, and operation of automatic electronic thermostat 50 can be found in co-pending patent application, U.S. patent application Ser. No. 08/247,033, for "Automatic Wall Thermostat," filed by John Weiss, co-inventor of the present invention, the disclosure of which is incorporated herein by reference. The sensing and control circuit 51 may be embodied as a microcontroller, such as Part. No. HD4074224S03 manufactured by Hitachi Corporation.

Concerning the power supply of the present invention, as employed for wall-mounted two terminal electronic thermostat 50: As previously discussed, DC leads 29a and 29b conduct unregulated, rectified AC voltage to filter capacitor 28, from rectifiers 37 or 38, in the embodiment of FIG. 3, or from rectifiers 38 or 42, in the embodiment of FIG. 4. The unregulated power on capacitor 28 is fed through resistor 61 to shunt regulating Zener diode 62 which is shunted by filter capacitor 63. This provides a first stage power supply with good regulation and low ripple for actuating relay 21, which typically requires about 20 milliamperes at 22 volts. This supply feeds a lower voltage regulating Zener diode 65 in parallel with filter capacitor 66, via series resistor 64. This second stage power supply has very low ripple and excellent regulation for operating the sensing and control circuitry of the thermostat, described above. Typically this circuitry draws less than ten milliamperes at 4 volts. Thus it can be seen that the OFF state power requirements are considerably less than the ON state power requirements when relay 21 is operating. As discussed earlier, this permits that portion of the OFF state power supplies of FIGS. 3 and 4 to be weaker than the ON state portions in that they need be strong enough only to furnish the power drawn by the sensing and control circuits—chiefly integrated circuit 51 and display 52—and to enable enough storage of energy in capacitor 28 to allow actuation of relay 21.

The power supplies of the present invention, as shown in FIGS. 3 and 4, have the inherent capability of being able to operate over a wide range of mains voltages. Thus, the thermostat can be applied to both 240 and 120 volt mains. This ability requires careful design of the first stage regulator, that is, of the resistance and power rating of resistor 61 and the voltage and power rating of Zener diode 62. Zener diode 62 is chosen to be close to the rectified voltage existing on DC leads 29a and 29b at the lowest mains voltage expected, that is, in the vicinity of 100 volts AC. Thus, at this lowest operating voltage, Zener diode 62 is starved, drawing no current. Resistor 61 is chosen to provide just enough load current for relay 21 and the sensing and control circuitry at this low mains voltage condition. Its power rating, and that of Zener diode 62, is chosen to be large enough to safely dissipate heat generated by the higher currents—chiefly passing through Zener diode 62—at the highest expected mains voltage, typically 270 volts. This ability to withstand that range of mains voltages means that installation does not require the services of a highly-skilled electrician. All the installer need do to replace a mechanical thermostat is remove the mechanical thermostat, connect the electronic thermostat's terminals, or pigtails, to the two existing wires in the electrical box in the wall, and mount the thermostat to that wall receptacle.

The design considerations discussed immediately above also permit operation over a very wide range of load currents, which will also substantially increase the voltage presented by transformer 34 to rectifier 38 and capacitor 28 at very high heater currents. This allows successful operation over a wide range of heater currents.

The power loss generated at high mains voltage can be reduced substantially by providing two models, one for each mains voltage. Errors in installation can occur, with consequences discussed earlier. This potential problem can be eliminated by providing self-setting voltage range means. The capacitive voltage divider lends itself to such a feature.

Figure 6:
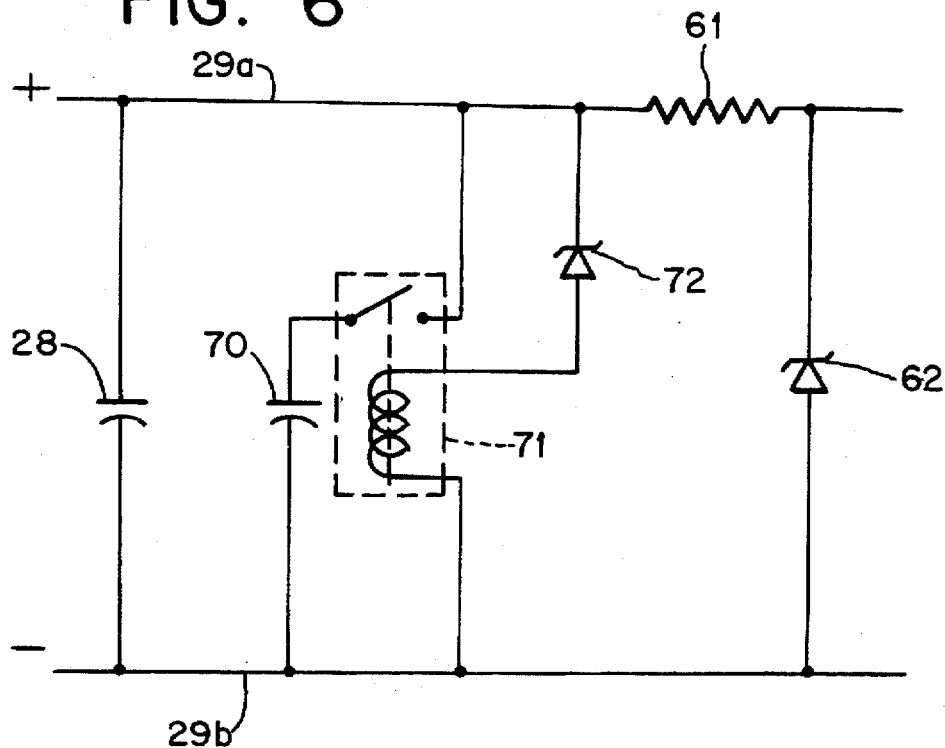
FIG. 6 is a schematic diagram of one form of the self-setting feature of the present invention, adapted to permit operation over a wide range of mains voltages.

One such self-setting configuration is illustrated in FIG. 6. In FIG. 6, DC leads 29a and 29b, filter capacitor 28, series resistor 61, and Zener diode 62 perform as described earlier. Relay 71 provides a means for switching capacitor 70 in parallel with capacitor 28, when mains voltage is high. Zener diode 72 is placed in series with the coil of relay 71, its operating voltage being such that relay 71 will not conduct enough current to close its contacts at any mains voltage to be expected when the mains voltage is in the 120 volt range—as for example, up to 140 volts. If mains voltage exceeds the minimum for 240 volt operation—200 volts, for example—enough current flows to close relay 71's contacts. Relay 71 is a self-latching relay; it requires far less current to hold its contacts closed than to pull the contacts closed from its fully open condition. In addition, Zener diode 72 does not permit relay 71 to actuate at the highest expected voltages generated by current transformer 34, to prevent switching to 240 volt operation while actually at 120 volt levels.

Capacitor 70 is chosen to have the same capacitance as capacitor 28. Thus, when relay 71 is actuated, the output capacitance of the capacitive voltage divider is doubled, and the former high voltage presented to the rectifiers by the 240 volt input is halved to the same voltage obtained during 120 volt operation. If the holding current of relay 71's coil is appreciably less than half the actuating current, relay 71 will stay closed. Alternatively, a second set of contacts could be employed to ensure holding, on relay actuation, these second contacts would short out Zener diode 72 in a manner well-known in the art.

Instead of relay 71, other switching devices could be employed, such as silicon-controlled-rectifiers, the bipolar latch described in U.S. Pat. No. 5,196,781, and the like. With these electronic switches, there is a tendency to drop out of conduction at every half cycle of current flow in the vicinity of AC zero crossings. However, since their gating source is well-filtered DC, they will be turned back on instantly with each small rise of voltage, with minor effect on the equivalent capacitance.

When the thermostat goes into the ON, or closed contact, state, relay 71 will drop out, for the excitation voltage to the capacitive voltage divider has disappeared. When the OFF state is re-attained, relay 71 will actuate as described above. Thus this self-setting feature is automatic and would permit the thermostat to be moved to a different mains voltage range without the need to reset or adjust the thermostat power supply. While this is also true of the circuit in FIG. 5, FIG. 6 has a lower energy consumption, that is, smaller relays requiring little power.

Figure 7:
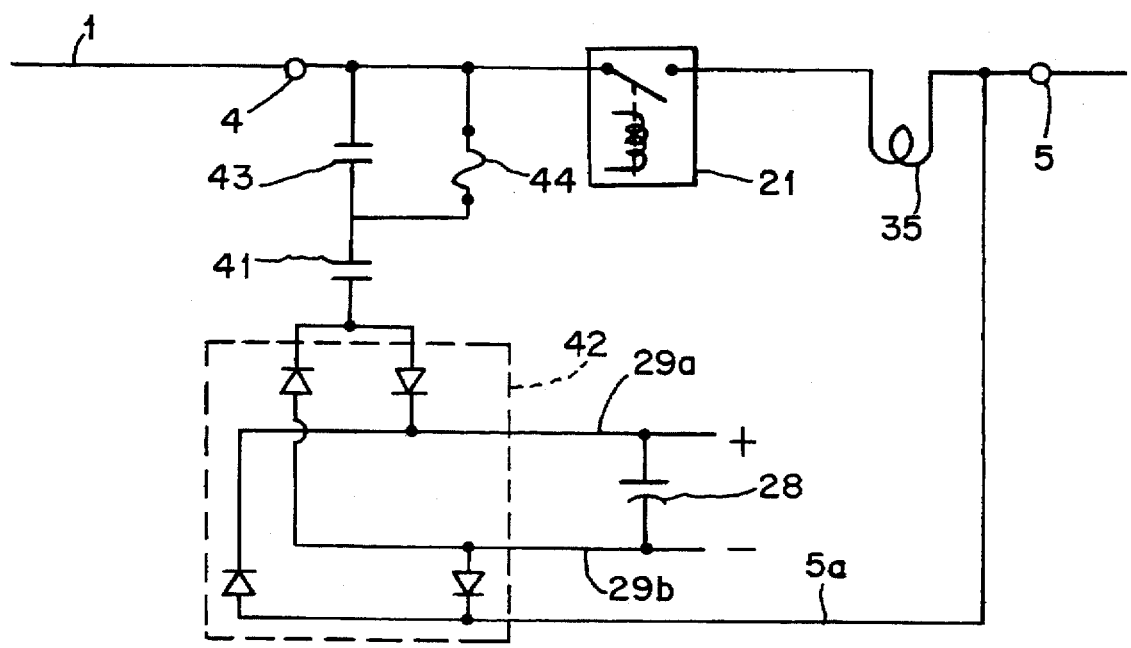
FIG. 7 is a schematic diagram of another form of the self-setting feature of the present invention, adapted to permit operation over a wide range of mains voltages.

The circuit of the present invention shown in FIG. 7 accomplishes self-setting, but on a permanent basis. In FIG. 7, components 43 and 44 are the only additions to the capacitive voltage divider-rectifier circuit of FIGS. 4 and 5. All other elements and components are as discussed heretofore. Capacitor 43, having the same capacitance as capacitor 41, is placed in series with capacitor 41, and shunted by fuse means 44. Fuse 44 is sized to allow maximum inrush current at the highest 120 volt mains voltage value—as at 140 volts, for example. Thus, while fuse 44 is intact, capacitor 43 sees no voltage drop, and is effectively not in the circuit. At the lowest 240 mains voltage value, as for example, 200 volts, or somewhat less, the higher inrush current will blow fuse 44. Capacitor 43 now drops a voltage equal to that on capacitor 41, thus effectively doubling the capacitive reactance in series with rectifier 42 and capacitor 28. This drops the output voltage of the capacitive voltage divider—at capacitor 28—to the same value as exists during 120 volt operation. No further action occurs and the thermostat is permanently set for 240 volt operation. To place into 120 volt operation, fuse 44 must be replaced. This circuit self-sets with a lower number of extra components and energy losses, and lowest cost.

Fuse 44 cannot be actuated by high voltages generated by transformer 34 from high load currents. Hence, unlike the invention of FIG. 6, no special consideration of this possibility need be taken into account during design of the circuit shown in FIG. 7.

The self-setting circuits of FIGS. 6 and 7 have no effect on the high voltages caused by high load currents, nor are they actuated by such voltages. However, by applying the design principles discussed in connection with FIG. 5, concerning resistor 61 and Zener diode 62, those high voltages can be accommodated. The resulting power losses will only occur during the ON state of the thermostat, unlike the thermostat power supply of FIG. 5.

It should be realized that fuse 44 shown in FIG. 7 may be replaced with a switch or removable jumper if it is desired to have the circuit of the present invention installed by an electrician rather than be self-setting. The electrician will decide whether to adjust the switch or remove the jumper when setting up the thermostat for operation at 120 volts AC or 240 volts AC. If the electrician removes the jumper or has the switch contacts in the open circuit position (so that capacitor 43 is not short circuited), the thermostat will still operate between about 100 volts AC and about 240 volts AC, but wastes power at 240 volts AC. If the electrician wires the thermostat to 120 volts AC with the switch in the shorted contact position or with the jumper in the circuit (so that capacitor 43 is shorted out), the circuit will starve for power and the thermostat will not have the power to pull in the relay 21, which will be immediately apparent to the electrician.

It should further be realized that capacitors 41, 28, 70 and 43 in the embodiments shown in FIGS. 4, 6 and 7 may be replaced with resistors or other components having a desired impedance to define a resistor or voltage divider network in the same manner as the capacitor divider network previously described in order to provide a predetermined voltage, with or without a self-setting capability as described, on DC leads 29a and 29b. The self-setting capability can be provided in the manner described previously and shown in FIGS. 6 and 7 and incorporated in whichever impedance leg of the voltage divider network results in the desired DC output voltage and depending upon how the impedance components sum (i.e., in parallel or in series).

Although illustrative embodiments of the present invention have been described herein with reference to the accompanying drawings, it is to be understood that this invention is not limited to those precise embodiments, and that various other changes and modifications may be effected therein by one skilled in the art without departing from the scope or spirit of the invention.

What is claimed is:

1. A power supply for an in-line power controller, the power controller being connectable in series with an electrical device and selectively providing power to the electrical device, the power controller including switching means being switchable between at least a substantially conductive and substantially non-conductive state and being connectable in series with the electrical device and control means for selectively controlling the substantially conductive and non-conductive states of the switching means, the power supply supplying power to at least one of the switching means and the control means, the power supply comprising:

a voltage transformer having a primary winding and a secondary winding, the primary winding of the voltage transformer being coupled in parallel with the switching means;

a current transformer separate from the voltage transformer, the current transformer having a primary winding and a secondary winding, the primary winding being connected in series with the switching means and connectable in series with the electrical device;

first rectifier means coupled to the secondary winding of the voltage transformer, the first rectifier means having DC outputs of opposite polarity;

second rectifier means separate from the first rectifier means, the second rectifier means being coupled to the secondary winding of the current transformer, the second rectifier means having DC outputs of opposite polarity; and voltage storage means, like polarities of the DC outputs of the first and second rectifier means being interconnected and coupled to the voltage storage means.

2. A power supply for an in-line power controller as defined by claim 1, wherein the switching means includes a relay having at least one pair of contacts which together selectively form a short circuit and an open circuit, the primary winding of the voltage transformer being coupled to the at least one pair of contacts.

3. A power supply for an in-line power controller as defined by claim 1, wherein the voltage storage means includes a capacitor, the capacitor being coupled to the DC outputs of the first and second rectifier means.

4. A power supply for an in-line power controller, the power controller being connectable in series with an electrical device and selectively providing power to the electrical device, the power controller including switching means being switchable between at least a substantially conductive and substantially non-conductive state and being connectable in series with the electrical device and control means for selectively controlling the substantially conductive and non-conductive states of the switching means, the power supply supplying power to at least one of the switching means and the control means, the power supply comprising:

a current transformer having a primary winding and a secondary winding, the primary winding being connected in series with the switching means and being connectable in series with the electrical device;

first rectifier means, the first rectifier means having at least a first AC input and a second AC input and having DC outputs of opposite polarity, the second AC input being coupled to the primary winding of the current transformer;

second rectifier means separate from the first rectifier means, the second rectifier means being coupled to the secondary winding of the current transformer, the second rectifier means having DC outputs of opposite polarity; and a capacitor divider network, the capacitor divider network including at least a first capacitor coupled between the switching means and the first AC input of the first rectifier means, and a second capacitor coupled between the DC outputs of the first and second rectifier means, like polarities of the DC outputs of the first and second rectifier means being interconnected.

5. A two-terminal electronic thermostat connectable in series with an electrical device and a source of AC power and selectively providing AC power to the electrical device, which comprises:

switching means conectable in series with the electrical device, the switching means being switchable between at least a substantially conductive and a substantially non-conductive state;

control means for selectively controlling the substantially conductive and non-conductive states of the switching means;

an ambient temperature sensor, the ambient temperature sensor generating an output signal corresponding to an ambient temperature sensed by the sensor, the control means being responsive to the output signal of the ambient temperature sensor;

adjustable means for adjustably setting a set point temperature, the adjustable set point temperature means generating an output signal corresponding to a selected set point temperature, the control means being responsive to the output signal of the adjustable set point temperature means;

a voltage transformer having a primary winding and a secondary winding, the primary winding of the voltage transformer being coupled in parallel with the switching means;

a current transformer separate from the voltage transformer, the current transformer having a primary winding and a secondary winding, the primary winding being connected in series with the switching means and connectable in series with the electrical device;

first rectifier means coupled to the secondary winding of the voltage transformer, the first rectifier means having DC outputs of opposite polarity;

second rectifier means separate from the first rectifier means, the second rectifier means being coupled to the secondary winding of the current transformer, the second rectifier means having DC outputs of opposite polarity; and a first capacitor, like polarities of the DC outputs of the first and second rectifier means being interconnected and coupled to the first capacitor.

6. A two-terminal electronic thermostat as defined by claim 5, which further comprises:

a first stage voltage regulating circuit, the first stage voltage regulating circuit being coupled to the DC outputs of the first and second rectifier means and providing a first stage regulated DC output voltage.

7. A two-terminal electronic thermostat as defined by claim 6, wherein the first stage voltage regulating circuit includes:

a first resistor;

a first zener diode coupled in series with the first resistor to form a series arrangement, the series arrangement of the first resistor and first zener diode being coupled across the DC outputs of the first and second rectifier means; and a first filter capacitor, the first filter capacitor being coupled in parallel with the zener diode.

8. A two-terminal electronic thermostat as defined by claim 7, which further comprises:

a second stage voltage regulating circuit, the second stage voltage regulating circuit being responsive to the first stage regulated DC output voltage and providing a second stage regulated DC output voltage in response thereto.

9. A two-terminal electronic thermostat as defined by claim 8, wherein the second stage voltage regulating circuit includes:

a second resistor;

a second zener diode coupled in series with the second resistor to form a series arrangement, the series arrangement of the second resistor and second zener diode being coupled in parallel with the first zener diode of the first stage voltage regulating circuit; and a second filter capacitor, the second filter capacitor being coupled in parallel with the second zener diode, at least one of the first stage regulated DC output voltage and the second stage regulated DC output voltage being provided to at least one of the control means and the switching means.

10. A two-terminal electronic thermostat connectable in series with an electrical device and a source of AC power and selectively providing AC power to the electrical device, which comprises:

switching means connectable in series with the electrical device, the switching means being switchable between at least a substantially conductive and a substantially non-conductive state;

control means for selectively controlling the substantially conductive and non-conductive states of the switching means;

an ambient temperature sensor, the ambient temperature sensor generating an output signal corresponding to an ambient temperature sensed by the sensor, the control means being responsive to the output signal of the ambient temperature sensor;

adjustable means for adjustably setting a set point temperature, the adjustable set point temperature means generating an output signal corresponding to a selected set point temperature, the control means being responsive to the output signal of the adjustable set point temperature means;

a current transformer having a primary winding and a secondary winding, the primary winding being connected in series with the switching means and being connectable in series with the electrical device;

first rectifier means, the first rectifier means having at least a first AC input and a second AC input and having DC outputs of opposite polarity, the second AC input being coupled to the primary winding of the current transformer;

second rectifier means separate from the first rectifier means, the second rectifier means being coupled to the secondary winding of the current transformer, the second rectifier means having DC outputs of opposite polarity; and a capacitor divider network, the capacitor divider network including at least a first capacitor coupled between the switching means and the first AC input of the first rectifier means, and a second capacitor coupled between the DC outputs of the first and second rectifier means, like polarities of the DC outputs of the first and second rectifier means being interconnected.

11. A two-terminal electronic thermostat as defined by claim 10, which further comprises:

a first stage voltage regulating circuit, the first stage voltage regulating circuit being coupled to the DC outputs of the first and second rectifier means and providing a first stage regulated DC output voltage.

12. A two-terminal electronic thermostat as defined by claim 11, wherein the first stage voltage regulating circuit includes:

a first resistor;

a first zener diode coupled in series with the first resistor to form a series arrangement, the series arrangement of the first resistor and first zener diode being coupled across the DC outputs of the first and second rectifier means; and a first filter capacitor, the first filter capacitor being coupled in parallel with the zener diode.

13. A two-terminal electronic thermostat as defined by claim 12, which further comprises:

a second stage voltage regulating circuit, the second stage voltage regulating circuit being responsive to the first stage regulated DC output voltage and providing a second stage regulated DC output voltage in response thereto.

14. A two-terminal electronic thermostat as defined by claim 13, wherein the second stage voltage regulating circuit includes:

a second resistor;

a second zener diode coupled in series with the second resistor to form a series arrangement, the series arrangement of the second resistor and second zener diode being coupled in parallel with the first zener diode of the first stage voltage regulating circuit; and a second filter capacitor, the second filter capacitor being coupled in parallel with the second zener diode, at least one of the first stage regulated DC output voltage and the second stage regulated DC output voltage being provided to at least one of the control means and the switching means.

15. A self-setting power supply for an in-line power controller, the power controller being connectable in series with an electrical device and selectively providing power to the electrical device, the power controller including switching means being switchable between at least a substantially conductive and substantially non-conductive state and being connectable in series with the electrical device and control means for selectively controlling the substantially conductive and non-conductive states of the switching means, the power supply supplying a DC voltage of a predetermined magnitude to at least one of the switching means and the control means, the power supply being alternatively connectable to different sources of higher and lower AC voltages while maintaining substantially the same magnitude of DC voltage provided to the at least one of the switching means and the control means, the power supply comprising:

a current transformer having a primary winding and a secondary winding, the primary winding being connected in series with the switching means and connectable in series with the electrical device;

first rectifier means, the first rectifier means having at least a first AC input and a second AC input and having DC outputs of opposite polarity, the second AC input being coupled to the primary winding of the current transformer;

second rectifier means separate from the first rectifier means, the second rectifier means being coupled to the secondary winding of the current transformer, the second rectifier means having DC outputs of opposite polarity;

a capacitor divider network, the capacitor divider network including at least a first branch having a first branch capacitance coupled between the switching means and the first AC input of the first rectifier means, and a second branch having a second branch capacitance coupled between the DC outputs of the first and second rectifier means, like polarities of the DC outputs of the first and second rectifier means being interconnected; and means for changing at least one of the first branch capacitance of the first branch and the second branch capacitance of the second branch of the capacitor divider network in response to the power supply being alternatively connected to the different sources of higher and lower AC voltages.

16. A self-setting power supply as defined by claim 15, wherein the second branch of the capacitor divider network includes at least a first capacitor and at least a second capacitor selectively coupled in parallel with the at least first capacitor; and wherein the capacitance changing means includes means coupled to the at least second capacitor for selectively coupling the at least second capacitor in parallel with the at least first capacitor thereby effectively changing the second branch capacitance.

17. A self-setting power supply as defined by claim 16, wherein the means for selectively coupling the at least second capacitor in parallel with the at least first capacitor includes a self-latching relay and a zener diode connected in series with the self-latching relay to form a series arrangement, the series arrangement of the self-latching relay and zener diode being coupled to the DC outputs of the first and second rectifier means, the relay having an energized state and a de-energized state, the energized state of the relay causing the at least second capacitor to be electrically in parallel with the at least first capacitor, the de-energized state of the relay causing the at least second capacitor to be electrically not in parallel with the at least first capacitor, the zener diode having an operating voltage, the operating voltage being selected such that the relay will be in a de-energized state when the power supply is connected to the source of lower AC voltage and such that the relay will be in an energized state when the power supply is connected to the source of higher AC voltage.

18. A self-setting power supply as defined by claim 15, wherein the first branch of the capacitor divider network includes at least a first capacitor and at least a second capacitor coupled in series with the at least first capacitor; and wherein the capacitance changing means includes means coupled to the at least second capacitor for selectively short circuiting the at least second capacitor thereby effectively changing the first branch capacitance.

19. A self-setting power supply as defined by claim 18, wherein the means for short circuiting the at least second capacitor includes a fuse, the fuse being coupled in parallel with the at least second capacitor, the fuse having a conductive state and a non-conductive state, the fuse being in a conductive state and thereby short circuiting the at least second capacitor when the power supply is connected to the source of lower AC voltage, and being in the non-conductive state when the power supply is connected to the source of higher AC voltage.

20. A power supply for an in-line two terminal AC power controller with an internal switching means responsive to the function to be controlled, the switching means having switch contacts which are selectively open and closed, the power supply comprising:

a first power source energized by a voltage existing across the switch contacts when the switch contacts are open, and a second power source energized by current flowing between the two terminals when the switch contacts are closed, whereby said first and second power sources furnish power alternately.

21. A power supply as defined by claim 20, which further comprises:

first rectifier means, the first power source furnishing power to the first rectifier means; and second rectifier means, the second power source furnishing power to the second rectifier means, each of the first and second rectifier means having outputs;

wherein the outputs of each of said first and second rectifier means being connected in parallel, whereby the first and second rectifier means electrically isolate the first and second power sources each from the other.

22. A power supply for an in-line power controller, the power controller being connectable in series with an electrical device and selectively providing power to the electrical device, the power controller including switching means being switchable between at least a substantially conductive and substantially non-conductive state and being connectable in series with the electrical device and control means for selectively controlling the substantially conductive and non-conductive states of the switching means, the power supply supplying power to at least one of the switching means and the control means, the power supply comprising:

a current transformer having a primary winding and a secondary winding, the primary winding being connected in series with the switching means and being connectable in series with the electrical device;

first rectifier means, the first rectifier means having at least a first AC input and a second AC input and having DC outputs of opposite polarity, the second AC input being coupled to the primary winding of the current transformer;

second rectifier means separate from the first rectifier means, the second rectifier means being coupled to the secondary winding of the current transformer, the second rectifier means having DC outputs of opposite polarity; and a voltage divider network, the voltage divider network including at least a first component having a predetermined impedance coupled between the switching means and the first AC input of the first rectifier means, and a second component having a predetermined impedance coupled between the DC outputs of the first and second rectifier means, like polarities of the DC outputs of the first and second rectifier means being interconnected.

23. A two-terminal electronic thermostat connectable in series with an electrical device and a source of AC power and selectively providing AC power to the electrical device, which comprises:

switching means connectable in series with the electrical device, the switching means being switchable between at least a substantially conductive and a substantially non-conductive state;

control means for selectively controlling the substantially conductive and non-conductive states of the switching means;

an ambient temperature sensor, the ambient temperature sensor generating an output signal corresponding to an ambient temperature sensed by the sensor, the control means being responsive to the output signal of the ambient temperature sensor;

adjustable means for adjustably setting a set point temperature, the adjustable set point temperature means generating an output signal corresponding to a selected set point temperature, the control means being responsive to the output signal of the adjustable set point temperature means;

a current transformer having a primary winding and a secondary winding, the primary winding being connected in series with the switching means and being connectable in series with the electrical device;

first rectifier means, the first rectifier means having at least a first AC input and a second AC input and having DC outputs of opposite polarity, the second AC input being coupled to the primary winding of the current transformer;

second rectifier means separate from the first rectifier means, the second rectifier means being coupled to the secondary winding of the current transformer, the second rectifier means having DC outputs of opposite polarity; and a voltage divider network, the voltage divider network including at least a first component having a predetermined impedance coupled between the switching means and the first AC input of the first rectifier means, and a second component having a predetermined impedance coupled between the DC outputs of the first and second rectifier means, like polarities of the DC outputs of the first and second rectifier means being interconnected.

24. A self-setting power supply for an in-line power controller, the power controller being connectable in series with an electrical device and selectively providing power to the electrical device, the power controller including switching means being switchable between at least a substantially conductive and substantially non-conductive state and being connectable in series with the electrical device and control means for selectively controlling the substantially conductive and non-conductive states of the switching means, the power supply supplying a DC voltage of a predetermined magnitude to at least one of the switching means and the control means, the power supply being alternatively connectable to different sources of higher and lower AC voltages while maintaining substantially the same magnitude of DC voltage provided to the at least one of the switching means and the control means, the power supply comprising:

a current transformer having a primary winding and a secondary winding, the primary winding being connected in series with the switching means and connectable in series with the electrical device;

first rectifier means, the first rectifier means having at least a first AC input and a second AC input and having DC outputs of opposite polarity, the second AC input being coupled to the primary winding of the current transformer;

second rectifier means separate from the first rectifier means, the second rectifier means being coupled to the secondary winding of the current transformer, the second rectifier means having DC outputs of opposite polarity;

a voltage divider network, the voltage divider network including at least a first branch having a first branch impedance coupled between the switching means and the first AC input of the first rectifier means, and a second branch having a second branch impedance coupled between the DC outputs of the first and second rectifier means, like polarities of the DC outputs of the first and second rectifier means being interconnected; and means for changing at least one of the first branch impedance of the first branch and the second branch impedance of the second branch of the voltage divider network in response to the power supply being alternatively connected to the different sources of higher and lower AC voltages.

* * * * *